(12) United States Patent
Negishi

(10) Patent No.: US 9,650,285 B2
(45) Date of Patent: May 16, 2017

(54) GLASS, GLASS MATERIAL FOR PRESS MOLDING, OPTICAL ELEMENT BLANK, AND OPTICAL ELEMENT

(71) Applicant: HOYA CORPORATION, Tokyo (JP)

(72) Inventor: Tomoaki Negishi, Hino (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/868,940

(22) Filed: Sep. 29, 2015

(65) Prior Publication Data

US 2016/0090320 A1  Mar. 31, 2016

(30) Foreign Application Priority Data

Sep. 30, 2014  (JP) .................. 2014-202516

(51) Int. Cl.
  *C03C 3/068*  (2006.01)
(52) U.S. Cl.
  CPC .................. *C03C 3/068* (2013.01)
(58) Field of Classification Search
  CPC .................................... C03C 3/068
  See application file for complete search history.

(56) References Cited

U.S. PATENT DOCUMENTS

| | | | | |
|---|---|---|---|---|
| 3,958,999 | A | * | 5/1976 | Izumitani ............... C03C 3/068 501/51 |
| 2003/0032542 | A1 | * | 2/2003 | Endo ....................... C03C 3/068 501/50 |
| 2003/0100433 | A1 | * | 5/2003 | Hayashi ................... C03B 7/12 501/79 |
| 2003/0211929 | A1 | * | 11/2003 | Hayashi ............... C03B 11/005 501/78 |
| 2004/0018933 | A1 | * | 1/2004 | Ogino ..................... C03C 3/062 501/45 |
| 2004/0106507 | A1 | * | 6/2004 | Kasuga ................... C03C 3/068 501/78 |
| 2005/0209087 | A1 | * | 9/2005 | Wolff ..................... C03C 3/068 501/78 |
| 2009/0082190 | A1 | * | 3/2009 | Ogino ..................... C03C 3/068 501/78 |
| 2009/0088310 | A1 | * | 4/2009 | Suzuki ................... C03C 3/068 501/78 |
| 2011/0077142 | A1 | * | 3/2011 | Yamaguchi ............ C03C 3/068 501/78 |
| 2014/0221191 | A1 | * | 8/2014 | Sun ....................... C03C 3/066 501/78 |

FOREIGN PATENT DOCUMENTS

| | | |
|---|---|---|
| CN | 103395981 A | 11/2013 |
| JP | S55-116641 A | 9/1980 |
| JP | S56-5345 A | 1/1981 |
| JP | S56-160340 A | 12/1981 |
| JP | S56-164033 A | 12/1981 |
| JP | S57-56344 A | 4/1982 |
| JP | S59-195553 A | 11/1984 |
| JP | 2005-239544 A | 9/2005 |
| JP | 2015-030631 A | 2/2015 |

OTHER PUBLICATIONS

Aug. 23, 2016 Office Action issued in Japanese Patent Application No. 2014-202516.

* cited by examiner

*Primary Examiner* — Elizabeth A Bolden
(74) *Attorney, Agent, or Firm* — Oliff PLC

(57) ABSTRACT

Provided is a glass which contains, by mass %, the following components: 20 to 35% of $SiO_2$ and $B_2O_3$ in total, 50 to 70% of $La_2O_3$, $Gd_2O_3$, $Y_2O_3$ and $Yb_2O_3$ in total, 37 to 69% of $La_2O_3$, 0 to 3% of $Gd_2O_3$, 3 to 30% of $Y_2O_3$, 0% or more but less than 2% of $Yb_2O_3$, 2 to 15% of $ZrO_2$, 1 to 6% of $TiO_2$, $Nb_2O_5$ and $Ta_2O_5$ in total, 0 to 4% of ZnO, and 0 to 2% of $WO_3$, wherein a mass ratio $ZnO/Nb_2O_5$ is in a range of 0 to 1.0 but $Nb_2O_5$ is contained as an essential component, a refractive index nd is in a range of 1.790 to 1.830, and an Abbe's number vd is in a range of 45 to 48.

11 Claims, No Drawings

GLASS, GLASS MATERIAL FOR PRESS MOLDING, OPTICAL ELEMENT BLANK, AND OPTICAL ELEMENT

CROSS-REFERENCE TO RELATED APPLICATIONS

This application claims the benefit of priority under 35 USC 119 to Japanese Patent Application No. 2014-202516 filed on Sep. 30, 2014, which is expressly incorporated herein by reference in its entirety.

BACKGROUND OF THE INVENTION

1. Field of the Invention

The present invention relates to a glass, a glass material for press molding, an optical element blank, and an optical element. More particularly, the present invention relates to a glass that has a refractive index nd ranging from 1.790 to 1.830 and an Abbe's number vd ranging from 45 to 48, a glass material for press molding, an optical element blank, and an optical element which are formed of this glass.

2. Description of Related Art

As an optical element material constituting an optical system, for example, an imaging optical system such as a camera lens or a projection optical system such as a projector, a high refractive index and low dispersion optical glass having a refractive index nd ranging from 1.790 to 1.830 and an Abbe's number vd ranging from 45 to 48 is known (e.g. see Patent Documents 1 to 6). In the following description, the refractive index and the Abbe's number refer to a refractive index nd for a line d and the Abbe's number vd for the line d, respectively, unless otherwise specified.

CITATION LIST

Patent Document (Patent Document 1) Japanese Patent Laid-Open Publication Sho 56-160340
(Patent Document 2) Japanese Patent Laid-Open Publication Sho 56-164033
(Patent Document 3) Japanese Patent Laid-Open Publication Sho 59-195553
(Patent Document 4) Japanese Patent Laid-Open Publication Sho 55-116641
(Patent Document 5) Japanese Patent Laid-Open Publication Sho 56-005345
(Patent Document 6) Japanese Patent Laid-Open Publication No. 2005-239544

SUMMARY OF THE INVENTION

Among glass components, $La_2O_3$, $Gd_2O_3$, $Y_2O_3$, and $Yb_2O_3$ may increase a refractive index without significantly increasing dispersion (i.e. without significantly decreasing an Abbe's number). Therefore, they are considered as components that are useful for preparing a high refractive index and low dispersion glass. Hence, the optical glasses described in Patent Documents 1 to 6 contain one or more of the aforementioned components. However, the optical glass realizing the high refractive index and low dispersion by containing the aforementioned components tends to be easily crystallized, in addition to lowering the thermal stability of glass.

Meanwhile, among examples described in Patent Document 3, the glass having the refractive index and the Abbe's number that fall within the above ranges contains a large amount of $WO_3$ as the glass components to enhance stability against the devitrification of the glass, that is, the thermal stability, and to prevent crystallization. However, in the optical glass containing a large amount of $WO_3$, an optical absorption edge of a short wavelength side of a spectral transmittance becomes longer in wavelength, so that the transmittance of ultraviolet rays is extremely low. On the other hand, in order to correct chromatic aberration in the above-described optical system, optical elements (lenses) made of the optical glasses having different optical properties may be bonded to each other. A cemented lens obtained by bonding the lenses to each other is generally manufactured as follows. First, a UV curable adhesive is applied to bonding surfaces between the lenses to cement the lenses together. Subsequently, ultraviolet rays are irradiated onto the adhesive through the lenses, thus curing the adhesive. Here, if the UV transmittance of the optical glass constituting each lens is low, it may take a longer time to cure the adhesive or it may be difficult to cure the adhesive. Thus, the optical glass used in the aforementioned optical system is preferably an optical glass that is configured such that the optical absorption edge of the short wavelength side of the spectral transmittance becomes shorter in wavelength and thereby has absorption characteristics which are desirable to manufacture the cemented lens.

An aspect of the present invention aims to provide a glass, which has a refractive index nd ranging from 1.790 to 1.830 and an Abbe's number vd ranging from 45 to 48, is excellent in thermal stability, and has absorption characteristics that are desirable to manufacture a cemented lens.

An aspect of the present invention provides a glass (hereinafter referred to as "glass A") containing, by mass %, the following components:
20 to 35% of $SiO_2$ and $B_2O_3$ in total,
50 to 70% of $La_2O_3$, $Gd_2O_3$, $Y_2O_3$ and $Yb_2O_3$ in total,
37 to 69% of $La_2O_3$,
0 to 3% of $Gd_2O_3$,
3 to 30% of $Y_2O_3$,
0% or more but less than 2% of $Yb_2O_3$,
2 to 15% of $ZrO_2$,
1 to 6% of $TiO_2$, $Nb_2O_5$ and $Ta_2O_5$ in total,
0 to 4% of $ZnO$, and
0 to 2% of $WO_3$,
wherein a mass ratio $ZnO/Nb_2O_5$ is in a range of 0 to 1.0, but $Nb_2O_5$ is contained as an essential component, and
a refractive index nd is in a range of 1.790 to 1.830, and an Abbe's number vd is in a range of 45 to 48.

Further, an aspect of the present invention provides a glass (hereinafter referred to as "glass B") containing, by mass %, the following components:
20 to 35% of $SiO_2$ and $B_2O_3$ in total,
50 to 70% of $La_2O_3$, $Gd_2O_3$, $Y_2O_3$ and $Yb_2O_3$ in total,
37 to 69% of $La_2O_3$,
0 to 3% of $Gd_2O_3$,
3% or more but less than 12% of $Y_2O_3$,
0% or more but less than 2% of $Yb_2O_3$,
2 to 15% of $ZrO_2$,
1 to 6% of $TiO_2$, $Nb_2O_5$ and $Ta_2O_5$ in total,
0 to 4% of $ZnO$, and
0 to 2% of $WO_3$,
wherein a mass ratio $ZnO/Nb_2O_5$ is in a range of 0 to 5.0, but $Nb_2O_5$ is contained as an essential component, and
a refractive index nd is in a range of 1.790 to 1.830, and an Abbe's number vd is in a range of 45 to 48.

Glasses A and B are the glass that has the refractive index and the Abbe's number in the aforementioned ranges, and is adjusted in composition so that the mass ratio $ZnO/Nb_2O_5$ is in the aforementioned ranges, thus exhibiting excellent thermal stability. Moreover, since the content of $WO_3$ is reduced, the optical absorption edge of the short wavelength side of the spectral transmittance becomes shorter in wavelength and thereby the glass has absorption characteristics which are desirable to manufacture a cemented lens.

According to an aspect of the present invention, provided is a glass that has the refractive index and the Abbe's number in the aforementioned ranges, is excellent in thermal stability and has absorption characteristics which are desirable to manufacture a cemented lens. Further, according to an aspect of the present invention, provided are a glass material for press molding, an optical element blank, and an optical element which are formed of the aforementioned glass.

DETAILED DESCRIPTION OF EMBODIMENTS

Glass

A glass according to an aspect of the present invention includes the above described glasses A and B. Hereinafter, they will be described in detail. Unless otherwise stated, the following description is applied to both the glass A and the glass B.

In the present invention, the glass composition of the glass is represented on the basis of oxide. Here, the expression of "the glass composition on the basis of oxide" refers to the glass composition when all of a glass raw material is decomposed during fusing and is present in the glass as the oxide. Further, unless otherwise stated, the glass composition is expressed on a mass basis (mass %, mass ratio).

The glass composition of the present invention may be quantified by a method such as the ICP-AES (Inductively Coupled Plasma-Atomic Emission Spectrometry), for example. An analytical value obtained by the ICP-AES may often have a measurement error of about ±5% for the analytical value. Further, in this specification and the present invention, the expression of "the content of the component is 0% or the component is not contained or introduced" means that this component is not substantially contained, and the content of this component is below an impurity level.

Glass Composition

In each glass A or B, a mass ratio $ZnO/Nb_2O_5$ of a ZnO content to a $Nb_2O_5$ content falls within the aforementioned ranges. Hereinafter, the reason why the mass ratio $ZnO/Nb_2O_5$ is defined will be described.

ZnO is a component that may change the Abbe's number vd and is useful to obtain desired optical properties (refractive index nd and Abbe's number vd). However, as the content of ZnO increases, the glass shows the tendency to lower the thermal stability.

Meanwhile, $Nb_2O_5$ is a component that may change the Abbe's number vd like ZnO, and may further enhance the thermal stability of the glass so that the glass is rarely devitrified.

Thus, it is possible to maintain the thermal stability while obtaining the desired optical properties, by adjusting the mass ratio $ZnO/Nb_2O_5$. The thermal stability of the glass is improved, that is, the glass shows less devitrification when the mass ratio $ZnO/Nb_2O_5$ is set to be low. However, the content of $Y_2O_3$ should also be considered for the thermal stability of the glass. The glass A has the content of $Y_2O_3$ in the range of 3 to 30%, whereas the glass B has the content of $Y_2O_3$ that is 3% or more but is less than 12%. As such, the glass B is lower in upper limit than the glass A. The introduction of $Y_2O_3$ may improve the thermal stability of the glass. However, if a large amount of $Y_2O_3$ is introduced, the glass shows the tendency to lower the thermal stability. Thus, in the glass A that is higher in the upper limit of the $Y_2O_3$ content than the glass B, the upper limit of the mass ratio $ZnO/Nb_2O_5$ of the glass A is lower than that of the glass B so as to maintain the thermal stability of the glass. Particularly, the mass ratio $ZnO/Nb_2O_5$ of the glass A is in the range of 0 to 1.0. In contrast, in the glass B that is lower in the upper limit of the $Y_2O_3$ content than the glass A, the upper limit of the mass ratio $ZnO/Nb_2O_5$ of the glass B is higher than that of the glass A. Particularly, the mass ratio $ZnO/Nb_2O_5$ of the glass B is in the range of 0 to 5.0.

Thus, both the glasses A and B are the glass that compatibly achieves the desired optical properties and improves the thermal stability by adjusting the mass ratio $ZnO/Nb_2O_5$ and the $Y_2O_3$ content.

A detailed description of the glasses A and B including the preferred ranges of the mass ratio $ZnO/Nb_2O_5$ and the $Y_2O_3$ content is as follows.

Hereinafter, the compositions of the glasses A and B will be described in more detail.

Both $SiO_2$ and $B_2O_3$ are components for forming a network of the glass. When a total content of $SiO_2$ and $B_2O_3$, namely, the sum of the $SiO_2$ content and the $B_2O_3$ content is adjusted to 20% or more, thus enhancing the thermal stability of the glass and thereby preventing the glass from being devitrified during the manufacture of the glass. Further, it is possible to increase the refractive index by adjusting the total content of $SiO_2$ and $B_2O_3$ to 35% or less. Therefore, in the glasses A and B, the total content of $SiO_2$ and $B_2O_3$ is set to be in the range of 20 to 35%. The lower limit of the total content of $SiO_2$ and $B_2O_3$ is preferably 23%, and more preferably 25%. The upper limit of the total content of $SiO_2$ and $B_2O_3$ is preferably 33%, and more preferably 32%.

$SiO_2$ is a component that improves the thermal stability and the chemical durability of the glass and is effective to adjust viscosity when a molten glass is molded. In terms of obtaining these effects, the lower limit of the $SiO_2$ content is preferably 1%, and more preferably 2%. Meanwhile, if the content of $SiO_2$ is increased, the refractive index may tend to be lowered, and the glass raw material may remain un-melted during fusing. That is, the fusibility of the glass also tends to be lowered. In order to obtain the desired optical properties while maintaining the thermal stability and the good fusibility of the glass, the upper limit of the $SiO_2$ content is preferably 15%, more preferably 10%, and even more preferably 5%.

$B_2O_3$ is a component that serves to improve the thermal stability and the fusibility of the glass. In order to obtain these effects, the lower limit of the $B_2O_3$ content is preferably 5%, more preferably 10%, and even more preferably 15%. Meanwhile, if the content of $B_2O_3$ is increased, the refractive index tends to be lowered. In order to obtain the desired optical properties while maintaining the thermal stability of the glass, the upper limit of the $B_2O_3$ content is preferably 34%, more preferably 32%, and even more preferably 30%.

In order to maintain a high refractive index without reducing the Abbe's number, the mass ratio of the $B_2O_3$ content to the total content of $SiO_2$ and $B_2O_3$, namely $B_2O_3/(SiO_2+B_2O_3)$ is preferably 0.90 or less, more preferably 0.89 or less, and even more preferably 0.88 or less. If the mass ratio $(B_2O_3/(SiO_2+B_2O_3))$ is adjusted to be in the aforementioned ranges, the viscosity is increased when the molten glass is molded, thus facilitating the molding operation.

Meanwhile, in order to maintain the thermal stability and the fusibility of the glass, the mass ratio ($B_2O_3/(SiO_2+B_2O_3)$) is preferably 0.4 or more, more preferably 0.5 or more, and even more preferably 0.6 or more.

All of $La_2O_3$, $Gd_2O_3$, $Y_2O_3$ and $Yb_2O_3$ are components that increase the refractive index without increasing the dispersion (without reducing the Abbe's number). If the total content of $La_2O_3$, $Gd_2O_3$, $Y_2O_3$ and $Yb_2O_3$ is 50% or more, it is possible to realize the desired optical properties. Further, if the total content of $La_2O_3$, $Gd_2O_3$, $Y_2O_3$ and $Yb_2O_3$, namely, the sum of the $La_2O_3$ content, the $Gd_2O_3$ content, the $Y_2O_3$ content and the $Yb_2O_3$ content is 70% or less, it is possible to improve the thermal stability of the glass, thus preventing the glass from being easily devitrified during the manufacture of the glass. Therefore, in the glasses A and B, the total content of $La_2O_3$, $Gd_2O_3$, $Y_2O_3$ and $Yb_2O_3$ is set to be in the range of 50 to 70%. The lower limit of the total content of $La_2O_3$, $Gd_2O_3$, $Y_2O_3$ and $Yb_2O_3$ is preferably 53%, and more preferably 55%. The upper limit of the total content of $La_2O_3$, $Gd_2O_3$, $Y_2O_3$ and $Yb_2O_3$ is preferably 67%, and more preferably 65%.

$Gd_2O_3$ is a component that increases the specific gravity of the glass among the glass components. Since the supply amount of $Gd_2O_3$ is limited, it is an expensive component. Thus, in order to stably supply the glass, the reduction in the $Gd_2O_3$ content is required. Consequently, in the glasses A and B, the content of $Gd_2O_3$ is in the range of 0 to 3%. The content of $Gd_2O_3$ is preferably in the range of 0 to 2%, more preferably 0 to 1%, even more preferably 0 to 0.5%, and still more preferably is 0%.

Further, the content of $Gd_2O_3$ may be determined by the mass ratio of the $Gd_2O_3$ content to the total content ($La_2O_3$+$Gd_2O_3$+$Y_2O_3$+$Yb_2O_3$) of $La_2O_3$, $Gd_2O_3$, $Y_2O_3$ and $Yb_2O_3$, namely, $Gd_2O_3/(La_2O_3+Gd_2O_3+Y_2O_3+Yb_2O_3)$. Since Gd as well as Yb is larger in atomic weight than La or Y, it is likely to increase the specific gravity of the glass. Further, in order to stably supply the glass, the content of Gd should be reduced. From this point of view, the mass ratio ($Gd_2O_3/(La_2O_3+Gd_2O_3+Y_2O_3+Yb_2O_3)$) is preferably in the range of 0 to 0.05, more preferably 0 to 0.03, even more preferably 0 to 0.02, and still more preferably 0 to 0.01. The mass ratio ($Gd_2O_3/(La_2O_3+Gd_2O_3+Y_2O_3+Yb_2O_3)$) may also be zero.

Meanwhile, among $La_2O_3$, $Gd_2O_3$, $Y_2O_3$, and $Yb_2O_3$, $La_2O_3$ is a component that rarely reduces the thermal stability even if a large amount of $La_2O_3$ is contained. Further, since La is not a heavy rare-earth element like Gd or Yb, La does not easily increase the specific gravity of the glass as compared to Gd and Yb. Moreover, a La compound for obtaining the glass that contains $La_2O_3$ therein is stably available. In addition, La is a component that has no absorption in a near infrared region like Yb.

Therefore, in the glasses A and B, in order to maintain the thermal stability of the glass and obtain the desired optical properties while suppressing the content of $Gd_2O_3$ within the aforementioned ranges, the content of $La_2O_3$ is set to 37% or more. Further, in order to maintain the thermal stability of the glass, the content of $La_2O_3$ is set to 69% or less. Thus, in the glasses A and B, the content of $La_2O_3$ is set to be in the range of 37 to 69%. The lower limit of the $La_2O_3$ content is preferably 40%, more preferably 41%, even more preferably 42%, and still more preferably 43%. The upper limit of the $La_2O_3$ content is preferably 60%, more preferably 55%, and even more preferably 50%.

The content of $La_2O_3$ may be determined by the mass ratio of the $La_2O_3$ content to the total content ($La_2O_3$+$Gd_2O_3$+$Y_2O_3$+$Yb_2O_3$) of $La_2O_3$, $Gd_2O_3$, $Y_2O_3$ and $Yb_2O_3$, namely, $La_2O_3/(La_2O_3+Gd_2O_3+Y_2O_3+Yb_2O_3)$. For the above-described reason, it is preferable that the mass ratio ($La_2O_3/(La_2O_3+Gd_2O_3+Y_2O_3+Yb_2O_3)$) is set to 0.55 or more. Meanwhile, the thermal stability is likely to be degraded in the glass containing only $La_2O_3$ among $La_2O_3$, $Gd_2O_3$, $Y_2O_3$, and $Yb_2O_3$. Therefore, in order to maintain the thermal stability, it is preferable that the mass ratio ($La_2O_3/(La_2O_3+Gd_2O_3+Y_2O_3+Yb_2O_3)$) is set to 0.95 or less. For the above-described reason, the lower limit of the mass ratio ($La_2O_3/(La_2O_3+Gd_2O_3+Y_2O_3+Yb_2O_3)$) is preferably 0.60, more preferably 0.65, even more preferably 0.70, and still more preferably 0.75. Further, the upper limit of the mass ratio ($La_2O_3/(La_2O_3+Gd_2O_3+Y_2O_3+Yb_2O_3)$) is preferably 0.91, more preferably 0.88, and even more preferably 0.85. By setting the mass ratio ($La_2O_3/(La_2O_3+Gd_2O_3+Y_2O_3+Yb_2O_3)$) within the aforementioned ranges, the content of $Yb_2O_3$ that has the absorption in the near infrared region is limited, so that it is possible to obtain the glass having a high transmittance even in the near infrared region.

$Y_2O_3$ is a component that serves to improve the thermal stability of the glass when a proper amount of $Y_2O_3$ is contained. In order to obtain such an effect, in the glasses A and B, the content of $Y_2O_3$ is set to 3% or more. Meanwhile, as described above, in order to maintain the thermal stability of the glass, the content of $Y_2O_3$ is set to 30% or less in the glass A, and is set to be less than 12% in the glass B.

In the glass A, the lower limit of the $Y_2O_3$ content is preferably 4%, more preferably 5%, even more preferably 7%, and still more preferably 9%, while the upper limit of the $Y_2O_3$ content is preferably 25%, more preferably 20%, and even more preferably 15%.

In the glass B, the lower limit of the $Y_2O_3$ content is preferably 4%, more preferably 5%, even more preferably 7%, and still more preferably 9%, while the upper limit of the $Y_2O_3$ content is preferably 11.0%, more preferably 10.5%, and even more preferably 10.0%.

The content of $Y_2O_3$ may be determined by the mass ratio of the $Y_2O_3$ content to a total content of $La_2O_3$, $Gd_2O_3$, $Y_2O_3$ and $Yb_2O_3$, namely, $Y_2O_3/(La_2O_3+Gd_2O_3+Y_2O_3+Yb_2O_3)$. In order to improve the thermal stability of the glass, the mass ratio ($Y_2O_3/(La_2O_3+Gd_2O_3+Y_2O_3+Yb_2O_3)$) is preferably set to 0.05 or more, and is preferably set to 0.45 or less. Further, for above-described reason, the lower limit of the mass ratio ($Y_2O_3/(La_2O_3+Gd_2O_3+Y_2O_3+Yb_2O_3)$) is preferably 0.09, more preferably 0.15, and even more preferably 0.18, while the upper limit of the mass ratio ($Y_2O_3/(La_2O_3+Gd_2O_3+Y_2O_3+Yb_2O_3)$) is preferably 0.40, more preferably 0.35, even more preferably 0.30, and still more preferably 0.25. By setting the mass ratio ($Y_2O_3/(La_2O_3+Gd_2O_3+Y_2O_3+Yb_2O_3)$) within the aforementioned ranges, the content of $Yb_2O_3$ having the absorption in the near infrared region is limited, so that it is possible to obtain the glass having the high transmittance even in the near infrared region.

Although the above-described Patent Document 2 discloses the optical glass containing $Yb_2O_3$ of 2% or more, such an optical glass absorbs a lot of near infrared rays. Meanwhile, the glass used for a camera lens, in particular, a lens for a camera such as a night vision camera or a surveillance camera requires a high near infrared transmittance. The optical glass described in Patent Document 2 is unsuitable for such a purpose. In contrast, in the glasses A and B, the content of $Yb_2O_3$ is set to be 0% or more but less than 2% in order to obtain the glass that is suitable for the aforementioned purpose by increasing the near infrared transmittance. However, the glasses A and B may be used for various purposes to which the glass, preferably, the optical glass is applied, without being limited to the aforementioned purpose. The content of $Yb_2O_3$ preferably ranges from 0 to 1.0%, more preferably is 0% or more but less than 1.0%, even more preferably ranges from 0 to 0.9%, still more preferably ranges from 0 to 0.5%, and even still more preferably is 0% or more but less than 0.1%. The content of $Yb_2O_3$ may be 0%. Since Yb is larger in atomic weight than La, Y and Gd, Yb can easily increase the specific gravity of the glass. In addition, Yb as well as Gd belongs to the heavy rare-earth element, so that it is required to reduce the use of Yb. By setting the content of $Yb_2O_3$ within the aforementioned ranges, it is possible to inhibit the specific gravity of the glass from increasing and to reduce the content of the heavy rare-earth element that is required to be reduced in its use amount.

The content of $Yb_2O_3$ may be determined by the mass ratio of the $Yb_2O_3$ content to the total content ($La_2O_3+Gd_2O_3+Y_2O_3+Yb_2O_3$) of $La_2O_3$, $Gd_2O_3$, $Y_2O_3$ and $Yb_2O_3$, namely, $Yb_2O_3/(La_2O_3+Gd_2O_3+Y_2O_3+Yb_2O_3)$. For this reason, the mass ratio ($Yb_2O_3/(La_2O_3+Gd_2O_3+Y_2O_3+Yb_2O_3)$) is preferably in the range of 0 to 0.05, more preferably 0 to 0.03, even more preferably 0 to 0.02, and still more preferably 0 to 0.01. The mass ratio ($Yb_2O_3/(La_2O_3+Gd_2O_3+Y_2O_3+Yb_2O_3)$) may be zero.

In order to prepare the glass having the required refractive index and Abbe's number while maintaining the thermal stability of the glass, the mass ratio (($La_2O_3+Gd_2O_3+Y_2O_3+Yb_2O_3)/(SiO_2+B_2O_3$)) of the total content of $La_2O_3$, $Gd_2O_3$, $Y_2O_3$ and $Yb_2O_3$ to the total content of $SiO_2$ and $B_2O_3$ is preferably 1.83 or more, more preferably 1.84 or more, and even more preferably 1.85 or more. In order to maintain the thermal stability and the fusibility of the glass, the mass ratio (($La_2O_3+Gd_2O_3+Y_2O_3+Yb_2O_3)/(SiO_2+B_2O_3$)) is preferably 3.0 or less, more preferably 2.7 or less, and even more preferably 2.5 or less.

$ZrO_2$ is a component that serves to increase the refractive index while improving the thermal stability of the glass. In order to obtain such an effect, in the glasses A and B, the content of $ZrO_2$ is set to be in the range of 2 to 15%. The lower limit of the $ZrO_2$ content is preferably 4% and more preferably 6%, while the upper limit of the $ZrO_2$ content is preferably 13% and more preferably 10%.

All of $TiO_2$, $Nb_2O_5$ and $Ta_2O_5$ are components (high-refractive-index components) that serve to increase the refractive index. Likewise, when comparing them with $La_2O_3$, $Gd_2O_3$, $Y_2O_3$ and $Yb_2O_3$ that are the high-refractive-index components, they are prone to have the high dispersion (low Abbe's number) as their contents are increased. In the glasses A and B, in order to achieve the desired optical properties while improving the thermal stability of the glass, the total content of $TiO_2$, $Nb_2O_5$ and $Ta_2O_5$, namely, the sum of the $TiO_2$ content, the $Nb_2O_5$ content and the $Ta_2O_5$ content is set to be in the range of 1 to 6%. The lower limit of the total content of $TiO_2$, $Nb_2O_5$ and $Ta_2O_5$ is preferably 1.5% and more preferably 2.0%, while the upper limit of the total content of $TiO_2$, $Nb_2O_5$ and $Ta_2O_5$ is preferably 5.5% and more preferably 5.0%.

In order to obtain the desired optical properties while maintaining the thermal stability of the glass, the content of $TiO_2$ is preferably in the range of 0 to 3%, more preferably 0 to 2%, and even more preferably 0 to 1%.

In order to obtain the desired optical properties while maintaining the thermal stability of the glass, the content of $Nb_2O_5$ is preferably in the range of 0.5 to 6%, more preferably 1.0 to 5%, and even more preferably 1.5 to 4%.

$Ta_2O_5$ is an expensive component among the high-refractive-index components, and serves to increase the specific gravity of the glass. Thus, in order to more stably supply the glass by suppressing the production cost of the glass and to inhibit the specific gravity from being increased, the content of $Ta_2O_5$ is preferably in the range of 0 to 5% and more preferably 0 to 2%. The content of $Ta_2O_5$ may be set to 0%.

In order to prepare the glass having the required refractive index and Abbe's number while maintaining the thermal stability of the glass, the mass ratio (($La_2O_3+Gd_2O_3+Y_2O_3+Yb_2O_3+TiO_2+Nb_2O_5+Ta_2O_5)/(SiO_2+B_2O_3$)) of the total content of $La_2O_3$, $Gd_2O_3$, $Y_2O_3$, $Yb_2O_3$, $TiO_2$, $Nb_2O_5$ and $Ta_2O_5$ to the total content of $SiO_2$ and $B_2O_3$ is preferably 1.95 or more, more preferably 1.96 or more, and even more preferably 1.97 or more. In order to maintain the thermal stability and fusibility of the glass, the mass ratio (($La_2O_3+Gd_2O_3+Y_2O_3+Yb_2O_3+TiO_2+Nb_2O_5+Ta_2O_5)/(SiO_2+B_2O_3$)) is preferably 3 or less, more preferably 2.8 or less and even more preferably 2.7 or less.

ZnO is a component that is effective for adjusting the dispersion (Abbe's number), and is a certain component that serves to improve the fusibility of the glass. In order to achieve the desired optical properties while maintaining the thermal stability of the glass, in the glasses A and B, the content of ZnO is in the range of 0 to 4%. The ZnO content is preferably in the range of 0 to 3%, and more preferably 0 to 2%.

Regarding the content of ZnO, the mass ratio (ZnO/$Nb_2O_5$) of the ZnO content to the $Nb_2O_5$ content has been described above.

$WO_3$ is a component that serves to increase the refractive index. As described above, in order to realize the absorption characteristics that are desirable to produce the cemented lens by causing the wavelength of the optical absorption edge of the short wavelength side of the spectral transmittance to become shorter, in the glasses A and B, the content of $WO_3$ is in the range of 0 to 2%. The content of $WO_3$ is preferably 1% or less, more preferably 0.5% or less, even more preferably 0.3% or less, and still more preferably 0.1% or less. The content of $WO_3$ may be 0%. That is, $WO_3$ may not be contained.

F is a component that considerably increases the volatility of the glass during fusing and impairs the stability and the homogeneity that are the optical properties of the glass. Thus, in the glasses A and B, the F content is preferably less than 0.1%, more preferably less than 0.08%, and even more preferably less than 0.05%. The F content may be 0%.

$Li_2O$, $Na_2O$, $K_2O$ and $Cs_2O$ serve to improve the fusibility of the glass. However, if a large amount is introduced, the refractive index may be reduced or the thermal stability of the glass may be lowered. Thus, the total content of $Li_2O$, $Na_2O$, $K_2O$ and $Cs_2O$, namely, the sum of the $Li_2O$ content, the $Na_2O$ content, the $K_2O$ content and the $Cs_2O$ content is preferably in the range of 0 to 5%, more preferably 0 to 2%, even more preferably 0 to 1%, and still more preferably 0 to 0.8%. The total content of $Li_2O$, $Na_2O$, $K_2O$ and $Cs_2O$ may be 0%.

MgO, CaO, SrO and BaO serve to improve the fusibility of the glass. However, if a large amount is introduced, the refractive index may be reduced or the thermal stability of the glass may be lowered. Thus, the total content of MgO, CaO, SrO and BaO, namely, the sum of the MgO content, the CaO content, the SrO content and the BaO content is preferably in the range of 0 to 5%, more preferably 0 to 2%, even more preferably 0 to 1%, and still more preferably 0 to 0.8%. The total content of MgO, CaO, SrO and BaO may be 0%.

Since $GeO_2$ is a network forming component (network forming oxide) and serves to increase the refractive index, it is a component that can increase the refractive index while maintaining the thermal stability of the glass. However, since $GeO_2$ is a very expensive component, it is required to decrease the content of $GeO_2$. The content of $GeO_2$ is preferably in the range of 0 to 2%, more preferably 0 to 1%, and even more preferably 0 to 0.8%. The content of $GeO_2$ may be 0%.

$Bi_2O_3$ serves to increase the refractive index as well as the thermal stability of the glass. In order to cause the wavelength of the absorption edge of the short wavelength side of the spectral transmittance to become shorter, the content of $Bi_2O_3$ is preferably in the range of 0 to 2%, more preferably 0 to 1%, and even more preferably 0 to 0.8%. The content of $Bi_2O_3$ may be 0%.

$Al_2O_3$ is a component that serves to improve the thermal stability and the chemical durability of the glass when a small amount is introduced. In order to improve the thermal stability and the chemical durability of the glass and to prevent a rise in liquidus temperature and a reduction in devitrification resistance, the $Al_2O_3$ content is preferably in the range of 0 to 2%, more preferably 0 to 1%, and even more preferably 0 to 0.8%. The content of $Al_2O_3$ may be 0%.

$Sb_2O_3$ is a component that may be added as a clarifying agent. When a small amount of $Sb_2O_3$ is added, it may serve to inhibit a reduction in light transmittance due to the inclusion of impurities such as Fe. However, if an added amount of $Sb_2O_3$ is increased, the coloring of the glass tends to be increased. Therefore, the added amount of $Sb_2O_3$ is preferably in the range of 0 to 0.1%, more preferably 0 to 0.05%, and even more preferably 0 to 0.03%, as a ratio of the content of $Sb_2O_3$ to the total content other than $Sb_2O_3$. Further, the content of $Sb_2O_3$ as a ratio of the content of $Sb_2O_3$ to the total content other than $Sb_2O_3$ means the content of $Sb_2O_3$ expressed by mass % when the sum of the contents of the glass components excluding $Sb_2O_3$ is defined as 100 mass %.

$SnO_2$ may also be added as a clarifying agent. However, if $SnO_2$ exceeding 1.0% as a ratio of the content of $SnO_2$ to the total content other than $SnO_2$ is added, the glass is colored or tends to be devitrified because Sn becomes a starting point of crystal nucleation when the glass is heated, softened, and then subjected to re-molding such as press molding. Therefore, the added amount of $SnO_2$ is preferably in the range of 0 to 1% and more preferably 0 to 0.5% as a ratio of the content of $SnO_2$ to the total content other than $SnO_2$. It is particularly preferable that no $SnO_2$ is added. Further, the $SnO_2$ content as a ratio of the content of $SnO_2$ to the total content other than $SnO_2$ means the content of $SnO_2$ expressed by mass % when the sum of contents of glass components other than $SnO_2$ is defined as 100 mass %.

The glasses A and B are a glass that can realize the refractive index and the Abbe's number in the above ranges while maintaining the thermal stability of the glass. The glasses A and B may be made without containing the components such as Lu and Hf. Since Lu and Hf are expensive components, each of the contents of $Lu_2O_3$ and $HfO_2$ is preferably kept in the range of 0 to 2%, more preferably kept in the range of 0 to 1%, even more preferably kept in the range of 0 to 0.8%, and still more preferably kept in the range of 0 to 0.1%. It is particularly preferable that no $Lu_2O_3$ is introduced and no $HfO_2$ is introduced.

Further, it is preferable that As, Pb, U, Th, Te and Cd are not introduced in consideration of effects on environment.

Furthermore, in order to realize the excellent light transmittance of the glass, it is preferable that substances causing the coloring, such as Cu, Cr, V, Fe, Ni or Co, are not introduced.

Both the glasses A and B are preferable as the optical glass.

The glass compositions of the glasses A and B have been described hereinbefore. Next, the glass characteristics of the glasses A and B will be described.

Glass Characteristics (Refractive index nd, Abbe's number vd)

In order to realize usability as the optical element material constituting the aforementioned optical system, particularly, chromatic aberration correction, high functionality of the optical system or the like, each of the glasses A and B has the refractive index nd in the range of 1.790 to 1.830. The lower limit of the refractive index nd is preferably 1.795, and more preferably 1.800. The upper limit of the refractive index nd is preferably 1.820, and more preferably 1.815.

From the same viewpoint, the Abbe's number vd of each of the glasses A and B is in the range of 45 to 48. The lower limit of the Abbe's number vd is preferably 45.5, and more preferably 46.0. The upper limit of the Abbe's number vd is preferably 47.0, and more preferably 46.8.

In order to realize the optical properties suitable for the chromatic aberration correction, a relationship between the refractive index nd and the Abbe's number vd preferably satisfies the following equation (1), more preferably satisfies the following equation (2), and even more preferably satisfies the following equation (3).

$$nd > 2.590 - 0.017 \times vd \quad (1)$$

$$nd > 2.585 - 0.017 \times vd \quad (2)$$

$$nd > 2.580 - 0.017 \times vd \quad (3)$$

(Coloring Degree λ5)

The glasses A and B may have absorption characteristics that are desirable to produce the cemented lens by adjusting the above-described glass composition. Such absorption characteristics may be evaluated by a coloring degree λ5. The coloring degree λ5 shows a wavelength where the spectral transmittance (including a surface reflection loss) of the glass having the thickness of 10 mm is 5% from a UV region to a visible region. λ5 shown in the following example is a value measured in a wavelength range of 280 to 700 nm. More particularly, the spectral transmittance is a spectral transmittance that is obtained by using a glass sample having parallel faces polished to the thickness of 10.0±0.1 mm, for example, and causing light to be perpendicularly incident on the aforementioned polished faces, namely, refers to Iout/Iin assuming that the intensity of light incident on the aforementioned glass sample is Iin and the intensity of light passing through the aforementioned glass sample is Iout.

According to the coloring degree λ5, it is possible to quantitatively evaluate the absorption edge of the short wavelength side of the spectral transmittance. As described above, when the optical elements are bonded to each other via a UV curable adhesive to produce the cemented lens, ultraviolet rays are irradiated through the optical elements onto the adhesive to cure the adhesive. In order to efficiently cure the UV curable adhesive, it is preferable that the absorption edge of the short wavelength side of the spectral transmittance is in the short wavelength range. The coloring degree λ5 may be used as an index for quantitatively evaluating the absorption edge of the short wavelength side. The coloring degree λ5 of the glass A or B is preferably 335 nm or less, more preferably 333 nm or less, even more preferably 330 nm or less, and still more preferably 325 nm or less. The lower limit of λ5 may be based on 300 nm by way of example. It is preferable to further reduce the lower limit of λ5. However, the lower limit of λ5 is not particularly limited.

On the other hand, a coloring degree λ70 may also be used as the index of the coloring degree of the glass. λ70 refers to a wavelength at which the spectral transmittance measured by the method described for λ5 is 70%. The coloring degree λ70 of each glass A or B is preferably 390 nm or less, more preferably 380 nm or less, and even more preferably 375 nm or less. The lower limit of λ70 may be based on 340 nm by way of example. It is preferable to further reduce the lower limit of λ70. However, the lower limit of λ70 is not particularly limited.

(Partial Dispersion Characteristics)

From the viewpoint of the chromatic aberration correction, the glasses A and B are preferably a glass that is low in partial dispersion ratio when the Abbe's number vd is fixed.

Here, the partial dispersion ratio Pg,F is expressed as (ng−nF)/(nF−nc) using the refractive indexes ng, nF, and nc at a g-line, an F-line, and a c-line.

In order to provide a glass that is desirable for high-order chromatic aberration correction, the partial dispersion ratio Pg,F of the glasses A and B is preferably 0.554 or more and is more preferably 0.555 or more, but is preferably 0.566 or less and is more preferably 0.563 or less.

(Specific Gravity)

If the mass of the lens is large as in the case where each glass A or B is used for a lens having an auto-focusing function, power consumption is increased during focusing and thereby the consumption of a battery is accelerated. In order to reduce the weight of the lens, it may be conceived that the specific gravity of the glass is decreased or the lens is made thin. In order to achieve thinness while maintaining the power of the lens, the refractive index of the glass has only to be increased. However, if the refractive index is simply increased, the specific gravity is also increased. Therefore, it is preferable to select the glass that is to be used, in consideration of both the specific gravity and the refractive index. As the index for the lightness of the optical element, a value (specific gravity/nd) obtained by dividing the specific gravity by the refractive index nd may be used. For example, the glasses A and B may preferably have the specific gravity/nd of 2.56 or less. The upper limit of the specific gravity/nd is more preferably 2.53, much more preferably 2.50, and even more preferably 2.48. Meanwhile, from the viewpoint of the glass stability, it is preferable that the specific gravity/nd is 2.00 or more.

Further, the specific gravity is preferably 4.7 or less, more preferably 4.6 or less, and still more preferably 4.5 or less. In addition, as the specific gravity is decreased, the liquidus temperature that will be described later tends to be lowered. From this viewpoint, the specific gravity is preferably 4.0 or more, and more preferably 4.2 or more.

(Glass Transition Temperature Tg)

If annealing temperature or temperature of the glass at the time of press molding is excessively high, it leads to the abrasion of an annealing furnace or a press-molding mold. In order to reduce a thermal load on the annealing furnace or the press-molding mold, the glass transition temperature Tg is preferably 720 degrees Celsius or less, but more preferably 710 degrees Celsius or less.

If the glass transition temperature Tg is too low, workability tends to be decreased in machining such as grinding or polishing. Therefore, in order to maintain the workability, the glass transition temperature Tg is preferably 640 degrees Celsius or more, more preferably 650 degrees Celsius or more, and even more preferably 660 degrees Celsius or more.

(Liquidus Temperature LT)

A liquidus temperature is one of indexes for the thermal stability of the glass. To suppress crystallization and devitrification during the manufacture of the glass, the liquidus temperature LT is preferably 1300 degrees Celsius or less, and more preferably 1250 degrees Celsius or less. The lower limit of the liquidus temperature LT is 1100 degrees Celsius or more by way of example. Its lower limit is preferably low, but is not limited particularly.

(Method for Manufacturing Glass)

In order to obtain an intended glass composition, the glasses A and B may be made in the following manner: oxide, carbonate, sulfate, nitrate, hydroxide or the like that are a raw material are weighed, blended, and mixed thoroughly to form a mixed batch, and then are heated, fused, defoamed, and agitated in a fusing vessel to make a molten glass that is homogeneous and contains no bubble, and thereafter the molten glass is molded. To be more specific, a known fusing method may be employed. Since the glasses A and B are the high refractive index and low dispersion glass having the aforementioned optical characteristics while being excellent in thermal stability, they may be stably manufactured using the known fusing method and molding method.

[Glass Material for Press Molding, Optical Element Blank, and Manufacturing Methods Thereof]

Another aspect of the present invention relates to:
a glass material for press molding that is made of the above-described glass; and
an optical element blank that is made of the above-described glass.

According to another aspect of the present invention, there are provided:
a method for producing a glass material for press molding having a step of molding the above-described glass into the glass material for press molding;
a method for producing an optical element blank having a step of making the optical element blank by press molding the above-described glass material for press molding using a press-molding mold; and
a method for producing an optical element blank having a step of molding the above-described glass into the optical element blank.

The optical element blank is an optical element preform that approximates to an intended shape of the optical element, and is obtained as the shape of the optical element by adding a polishing margin (a surface layer removed by polishing) and a grinding margin (a surface layer removed by grinding) as necessary. A surface of the optical element blank is subjected to grinding and polishing, so that the optical element is finished. In an aspect, it is possible to produce the optical element blank by a method (also referred to as a direct press method) of press-molding the molten glass obtained by fusing a proper amount of aforementioned glass. In another aspect, the optical element blank may be produced by solidifying the molten glass obtained by fusing a proper amount of aforementioned glass.

Moreover, in another aspect, it is possible to produce the optical element blank by preparing the glass material for press molding and then press molding the prepared glass material for press molding.

The glass material for press molding may be press molded by the known method wherein the glass material for press molding that is heated and softened is pressed in the press-molding mold. Both the heating and the press molding may be carried out in the air. By performing annealing after the press molding, a strain in the glass is reduced and thereby a homogeneous optical element blank is obtained.

The glass material for press molding includes, in addition to a glass gob for press molding that is subjected to the press molding for making the optical element blank from an original glass material, a material that goes through the glass gob for press molding by machining, such as cutting, grinding, polishing or the like and then is subjected to the press molding. As a cutting method, there are a method where a groove is formed in a portion on a surface of a glass plate that is desired to be cut by a method called scribing and local pressure is applied to the groove from a back of the surface having the groove to divide the glass plate at the groove, a method where the glass plate is cut by a cutting blade, or the like. Further, barrel polishing or the like may be used as the grinding or polishing method.

The glass material for press molding may be produced, for example, by injecting the molten glass into a mold to mold a glass plate and then cutting this glass plate into a plurality of glass pieces. Alternatively, it is possible to produce a glass gob for press molding by molding a proper amount of molten glass. The glass gob for press molding is reheated, softened and press molded, thus preparing the optical element blank. The method for producing the optical element blank by reheating, softening, and press molding the glass is referred to as a reheat press method to be distinguished from the direct press method.

[Optical Element and Manufacturing Method Thereof]

Another aspect of the present invention relates to an optical element made of the above-described glass.

In addition, according to an aspect of the present invention, provided is a method for producing an optical element having a step of making the optical element by grinding and/or polishing the above-described optical element blank.

In the above-described method for producing the optical element, grinding and polishing may use the known method, and it is possible to obtain the optical element that is high in internal quality and surface quality by sufficiently cleaning and drying the surface of the optical element that has been subjected to the machining. Thus, it is possible to obtain an optical element made of the glass (glass A or B) that has the refractive index nd in the range of 1.790 to 1.830 and the Abbe's number vd in the range of 45 to 48. Examples of the optical element may include various kinds of lenses, such as a spherical lens, an aspherical lens or a micro lens, a prism, or the like.

Further, the optical element made of the glass A or B may be suitable as a lens constituting a cemented optical element. Examples of the cemented optical element may include an element (cemented lens) made by bonding lenses to each other, an element made by bonding a lens to a prism, or the like. For example, the cemented optical element may be produced by precisely machining (e.g., spherical polishing) such that the shape of bonding surfaces of two bonded optical elements is reversed, applying a UV curable adhesive used for bonding a cemented lens, performing a cementing operation, and then irradiating ultraviolet rays through the lens to cure the adhesive. Thus, the glass having the above-described absorption characteristics is preferable to make the cemented optical element. When a plurality of optical elements that are to be bonded are produced, respectively, using a plurality of types of glasses that are different in Abbe's number vd and then bonded to each other, they may become elements that are suitable for the chromatic aberration correction.

EXAMPLES

Hereinafter, the present invention will be further described based on the examples. However, the present invention is not limited to aspects that are shown in the examples.

Example 1

In order to obtain the glass having the composition shown in Table 1, raw material powder such as carbonate, nitrate, sulfate, hydroxide, oxide, or boric acid was appropriately used. Each raw material powder was weighed and sufficiently mixed to prepare a blended raw material. This blended raw material was put into a platinum crucible, heated and fused at 1350 to 1400 degrees Celsius for 2 to 3 hours, and then refined and agitated, thus obtaining a homogeneous molten glass. This molten glass was poured into a preheated mold to be rapidly cooled, was maintained at a temperature in the vicinity of the glass transition temperature for 2 hours, and then was slowly cooled, thus obtaining each glass having the composition shown in Table 1. Precipitation of crystals was not observed in any of the glasses. Further, all the glasses were homogeneous, and the coloring of the glasses was not observed with the naked eyes.

The characteristics of each glass were measured by the following methods. The measured results are shown in Table 1.

(1) Refractive Index nd and Abbe's Number vd

They were measured for the glass that was cooled at a cooling rate of 30 degrees Celsius per hour.

(2) Glass Transition Temperature Tg

It was measured using a differential scanning calorimeter (DSC) under the condition of a heating rate of 10 degrees Celsius/min.

(3) Liquidus Temperature LT

After the glass was placed in a furnace heated to a predetermined temperature, maintained for 2 hours, and cooled, the interior of the glass was observed by an optical microscope of 100 magnification, so that the liquidus temperature was determined depending on whether crystals are present or not.

(4) Specific Gravity

It was measured by the Archimedes method.

(5) Coloring Degree $\lambda 5$, $\lambda 70$

A glass sample that has two optically polished planes facing each other and has the thickness of 10±0.1 mm was used, and light of intensity Iin was perpendicularly incident on the polished planes and the intensity Iout of light passing through the glass sample was measured by a spectrophotometer, so that a spectral transmittance Iout/Iin was calculated. A wavelength at which the spectral transmittance was 5% was defined as $\lambda 5$, and a wavelength at which the spectral transmittance was 70% was defined as $\lambda 70$.

(6) Partial Dispersion Ratio Pg,F

Refractive indexes nF, nc and ng were measured, and the partial dispersion ratio was calculated based on the measured results.

TABLE 1

| No. | | SiO$_2$ | B$_2$O$_3$ | ZnO | La$_2$O$_3$ | Gd$_2$O$_3$ | Y$_2$O$_3$ | Yb$_2$O$_3$ | ZrO$_2$ | TiO$_2$ |
|---|---|---|---|---|---|---|---|---|---|---|
| 1 | mass % | 2.1 | 26.8 | 3.2 | 47 | 0 | 9.8 | 0 | 7.6 | 0 |
| 2 | mass % | 2.9 | 26.7 | 3.2 | 43.3 | 0 | 12.8 | 0 | 7.6 | 0 |
| 3 | mass % | 2.9 | 27 | 2.2 | 47 | 0 | 9.9 | 0 | 8.1 | 1.1 |
| 4 | mass % | 3.7 | 26.3 | 2.7 | 46.6 | 0 | 9.8 | 0 | 8 | 1.1 |
| 5 | mass % | 7.8 | 21.4 | 0 | 52.3 | 0 | 7 | 0 | 7.4 | 0 |
| 6 | mass % | 8.4 | 19.9 | 2 | 51.5 | 0 | 6.9 | 0 | 7.3 | 0 |
| 7 | mass % | 8.5 | 20.8 | 0 | 53.7 | 0 | 5.6 | 0 | 7.4 | 0 |
| 8 | mass % | 8.3 | 17.5 | 1.9 | 41 | 0 | 20.2 | 0 | 7.2 | 0 |
| 9 | mass % | 8.2 | 17.4 | 1.9 | 42.8 | 0 | 20.1 | 0 | 7.2 | 0 |
| 10 | mass % | 8.3 | 18.5 | 0 | 42.4 | 0 | 20.3 | 0 | 7.3 | 0 |
| 11 | mass % | 8.3 | 18.2 | 0 | 42.2 | 0 | 20.9 | 0 | 7.2 | 0 |
| 12 | mass % | 8.3 | 18.5 | 0 | 44.2 | 0 | 18.5 | 0 | 6.5 | 0 |
| 13 | mass % | 8.3 | 18.5 | 0 | 44.1 | 0 | 18.9 | 0 | 6.2 | 0 |
| 14 | mass % | 9 | 17.6 | 0.5 | 44.2 | 0 | 18.3 | 0 | 8 | 0 |
| 15 | mass % | 2.9 | 27.1 | 0 | 47.8 | 0 | 11.3 | 0 | 8 | 1.1 |
| 16 | mass % | 2.9 | 27.1 | 0 | 48.1 | 0 | 12 | 0 | 7.6 | 0 |
| 17 | mass % | 2.9 | 26.8 | 1.4 | 45.6 | 0 | 11.8 | 0 | 8 | 0 |
| 18 | mass % | 2.9 | 27.1 | 0 | 46 | 0 | 12.2 | 0 | 8 | 0.1 |
| 19 | mass % | 3.3 | 26.7 | 0 | 45.8 | 0 | 12.5 | 0 | 7.9 | 0.1 |
| 20 | mass % | 3.6 | 26.2 | 0 | 45.6 | 0 | 12.9 | 0 | 7.9 | 0.1 |
| 21 | mass % | 3.1 | 26.9 | 0 | 46.6 | 0 | 12.5 | 0 | 8 | 0.9 |
| 22 | mass % | 3.4 | 26.5 | 0 | 45.9 | 0 | 13 | 0 | 8.6 | 0.8 |
| 23 | mass % | 3.3 | 26.6 | 0 | 46.5 | 0 | 12.3 | 0 | 8.7 | 0.7 |
| 24 | mass % | 8.3 | 18.5 | 0 | 44 | 2.1 | 16.8 | 0 | 7.9 | 0 |
| 25 | mass % | 3.6 | 25.8 | 0 | 45.0 | 0 | 12.7 | 0 | 7.8 | 0.1 |
| 26 | mass % | 3.6 | 26.1 | 0 | 44.6 | 0 | 12.9 | 0 | 7.9 | 0.1 |
| 27 | mass % | 3.6 | 26.2 | 0 | 45.6 | 0 | 12.9 | 0 | 7.9 | 0.1 |
| 28 | mass % | 3.6 | 25.8 | 0 | 44.9 | 0 | 12.7 | 0 | 7.8 | 0.1 |
| 29 | mass % | 3.6 | 26.1 | 0 | 45.5 | 0 | 12.9 | 0 | 7.9 | 0.1 |
| 30 | mass % | 3.6 | 26.0 | 0 | 45.3 | 0 | 12.9 | 0 | 7.9 | 0.1 |
| 31 | mass % | 3.6 | 25.9 | 0 | 45.0 | 0 | 12.8 | 0 | 7.8 | 0.1 |

| No. | Nb$_2$O$_5$ | Ta$_2$O$_5$ | WO$_3$ | Li$_2$O | Na$_2$O | K$_2$O | MgO | CaO | SrO | BaO | Total |
|---|---|---|---|---|---|---|---|---|---|---|---|
| 1 | 3.5 | 0 | 0 | 0 | 0 | 0 | 0 | 0 | 0 | 0 | 100 |
| 2 | 3.5 | 0 | 0 | 0 | 0 | 0 | 0 | 0 | 0 | 0 | 100 |
| 3 | 1.8 | 0 | 0 | 0 | 0 | 0 | 0 | 0 | 0 | 0 | 100 |
| 4 | 1.8 | 0 | 0 | 0 | 0 | 0 | 0 | 0 | 0 | 0 | 100 |
| 5 | 4.1 | 0 | 0 | 0 | 0 | 0 | 0 | 0 | 0 | 0 | 100 |
| 6 | 4 | 0 | 0 | 0 | 0 | 0 | 0 | 0 | 0 | 0 | 100 |
| 7 | 4 | 0 | 0 | 0 | 0 | 0 | 0 | 0 | 0 | 0 | 100 |
| 8 | 3.9 | 0 | 0 | 0 | 0 | 0 | 0 | 0 | 0 | 0 | 100 |
| 9 | 2.4 | 0 | 0 | 0 | 0 | 0 | 0 | 0 | 0 | 0 | 100 |
| 10 | 3.2 | 0 | 0 | 0 | 0 | 0 | 0 | 0 | 0 | 0 | 100 |
| 11 | 3.2 | 0 | 0 | 0 | 0 | 0 | 0 | 0 | 0 | 0 | 100 |
| 12 | 4 | 0 | 0 | 0 | 0 | 0 | 0 | 0 | 0 | 0 | 100 |
| 13 | 4 | 0 | 0 | 0 | 0 | 0 | 0 | 0 | 0 | 0 | 100 |
| 14 | 2.4 | 0 | 0 | 0 | 0 | 0 | 0 | 0 | 0 | 0 | 100 |
| 15 | 1.8 | 0 | 0 | 0 | 0 | 0 | 0 | 0 | 0 | 0 | 100 |
| 16 | 4.3 | 0 | 0 | 0 | 0 | 0 | 0 | 0 | 0 | 0 | 100 |
| 17 | 3.5 | 0 | 0 | 0 | 0 | 0 | 0 | 0 | 0 | 0 | 100 |
| 18 | 3.7 | 0 | 0 | 0 | 0 | 0 | 0 | 0 | 0 | 0 | 100 |
| 19 | 3.7 | 0 | 0 | 0 | 0 | 0 | 0 | 0 | 0 | 0 | 100 |
| 20 | 3.7 | 0 | 0 | 0 | 0 | 0 | 0 | 0 | 0 | 0 | 100 |
| 21 | 2 | 0 | 0 | 0 | 0 | 0 | 0 | 0 | 0 | 0 | 100 |
| 22 | 1.8 | 0 | 0 | 0 | 0 | 0 | 0 | 0 | 0 | 0 | 100 |
| 23 | 1.9 | 0 | 0 | 0 | 0 | 0 | 0 | 0 | 0 | 0 | 100 |
| 24 | 2.4 | 0 | 0 | 0 | 0 | 0 | 0 | 0 | 0 | 0 | 100 |
| 25 | 3.6 | 0 | 0 | 0 | 0 | 0 | 0 | 0.4 | 0 | 1.0 | 100 |
| 26 | 3.7 | 0 | 1.1 | 0 | 0 | 0 | 0 | 0 | 0 | 0 | 100 |
| 27 | 3.7 | 0 | 0 | 0 | 0 | 0 | 0 | 0 | 0 | 0 | 100 |
| 28 | 4.5 | 0 | 0 | 0.1 | 0.2 | 0.3 | 0 | 0 | 0 | 0 | 100 |
| 29 | 3.7 | 0 | 0 | 0.2 | 0 | 0 | 0 | 0 | 0 | 0 | 100 |
| 30 | 3.7 | 0 | 0 | 0 | 0 | 0 | 0.5 | 0 | 0 | 0 | 100 |
| 31 | 3.7 | 0 | 0 | 0 | 0 | 0.1 | 0 | 0.2 | 0.3 | 0.5 | 100 |

| No. | | Sb$_2$O$_3$ (as a ratio of the content of Sb$_2$O$_3$ to the total content other than Sb$_2$O$_3$) | SiO$_2$ + B$_2$O$_3$ | La$_2$O$_3$ + Gd$_2$O$_3$ + Y$_2$O$_3$ + Yb$_2$O$_3$ | TiO$_2$ + Nb$_2$O$_5$ + Ta$_2$O$_5$ |
|---|---|---|---|---|---|
| 1 | mass % | 0.02 | 28.9 | 56.8 | 3.5 |
| 2 | mass % | 0.02 | 29.6 | 56.1 | 3.5 |
| 3 | mass % | 0.02 | 29.9 | 56.9 | 2.9 |
| 4 | mass % | 0.02 | 30 | 56.4 | 2.9 |
| 5 | mass % | 0.02 | 29.2 | 59.3 | 4.1 |
| 6 | mass % | 0.02 | 28.3 | 58.4 | 4 |
| 7 | mass % | 0.02 | 29.3 | 59.3 | 4 |

TABLE 1-continued

| | | | | | |
|---|---|---|---|---|---|
| 8 | mass % | 0.02 | 25.8 | 61.2 | 3.9 |
| 9 | mass % | 0.02 | 25.6 | 62.9 | 2.4 |
| 10 | mass % | 0.02 | 26.8 | 62.7 | 3.2 |
| 11 | mass % | 0.02 | 26.5 | 63.1 | 3.2 |
| 12 | mass % | 0.02 | 26.8 | 62.7 | 4 |
| 13 | mass % | 0.02 | 26.8 | 63 | 4 |
| 14 | mass % | 0.02 | 26.6 | 62.5 | 2.4 |
| 15 | mass % | 0.02 | 30 | 59.1 | 2.9 |
| 16 | mass % | 0.02 | 30 | 58.1 | 4.3 |
| 17 | mass % | 0.02 | 29.7 | 57.4 | 3.5 |
| 18 | mass % | 0.02 | 30 | 58.2 | 3.8 |
| 19 | mass % | 0.02 | 30 | 58.3 | 3.8 |
| 20 | mass % | 0.02 | 29.8 | 58.5 | 3.8 |
| 21 | mass % | 0.02 | 30 | 59.1 | 2.9 |
| 22 | mass % | 0.02 | 29.9 | 58.9 | 2.6 |
| 23 | mass % | 0.02 | 29.9 | 58.8 | 2.6 |
| 24 | mass % | 0.02 | 26.8 | 62.9 | 2.4 |
| 25 | mass % | 0.02 | 29.4 | 57.7 | 3.7 |
| 26 | mass % | 0.02 | 29.7 | 57.5 | 3.8 |
| 27 | mass % | 0.02 | 29.8 | 58.5 | 3.8 |
| 28 | mass % | 0.02 | 29.4 | 57.6 | 4.6 |
| 29 | mass % | 0.02 | 29.7 | 58.4 | 3.8 |
| 30 | mass % | 0.02 | 29.6 | 58.2 | 3.8 |
| 31 | mass % | 0.02 | 29.5 | 57.8 | 3.8 |

| No. | ZnO/ Nb$_2$O$_5$ | La$_2$O$_3$/(La$_2$O$_3$ + Gd$_2$O$_3$ + Y$_2$O$_3$ + Yb$_2$O$_3$) | Gd$_2$O$_3$/(La$_2$O$_3$ + Gd$_2$O$_3$ + Y$_2$O$_3$ + Yb$_2$O$_3$) | Y$_2$O$_3$/(La$_2$O$_3$ + Gd$_2$O$_3$ + Y$_2$O$_3$ + Yb$_2$O$_3$) | Yb$_2$O$_3$/(La$_2$O$_3$ + Gd$_2$O$_3$ + Y$_2$O$_3$ + Yb$_2$O$_3$) |
|---|---|---|---|---|---|
| 1 | 0.91 | 0.83 | 0.00 | 0.17 | 0.00 |
| 2 | 0.91 | 0.77 | 0.00 | 0.23 | 0.00 |
| 3 | 1.22 | 0.83 | 0.00 | 0.17 | 0.00 |
| 4 | 1.50 | 0.83 | 0.00 | 0.17 | 0.00 |
| 5 | 0.00 | 0.88 | 0.00 | 0.12 | 0.00 |
| 6 | 0.50 | 0.88 | 0.00 | 0.12 | 0.00 |
| 7 | 0.00 | 0.91 | 0.00 | 0.09 | 0.00 |
| 8 | 0.49 | 0.67 | 0.00 | 0.33 | 0.00 |
| 9 | 0.79 | 0.68 | 0.00 | 0.32 | 0.00 |
| 10 | 0.00 | 0.68 | 0.00 | 0.32 | 0.00 |
| 11 | 0.00 | 0.67 | 0.00 | 0.33 | 0.00 |
| 12 | 0.00 | 0.70 | 0.00 | 0.30 | 0.00 |
| 13 | 0.00 | 0.70 | 0.00 | 0.30 | 0.00 |
| 14 | 0.21 | 0.71 | 0.00 | 0.29 | 0.00 |
| 15 | 0.00 | 0.81 | 0.00 | 0.19 | 0.00 |
| 16 | 0.00 | 0.79 | 0.00 | 0.21 | 0.00 |
| 17 | 0.40 | 0.79 | 0.00 | 0.21 | 0.00 |
| 18 | 0.00 | 0.79 | 0.00 | 0.21 | 0.00 |
| 19 | 0.00 | 0.79 | 0.00 | 0.21 | 0.00 |
| 20 | 0.00 | 0.78 | 0.00 | 0.22 | 0.00 |
| 21 | 0.00 | 0.79 | 0.00 | 0.21 | 0.00 |
| 22 | 0.00 | 0.78 | 0.00 | 0.22 | 0.00 |
| 23 | 0.00 | 0.79 | 0.00 | 0.21 | 0.00 |
| 24 | 0.00 | 0.70 | 0.03 | 0.27 | 0.00 |
| 25 | 0.00 | 0.78 | 0.00 | 0.22 | 0.00 |
| 26 | 0.00 | 0.78 | 0.00 | 0.22 | 0.00 |
| 27 | 0.00 | 0.78 | 0.00 | 0.22 | 0.00 |
| 28 | 0.00 | 0.78 | 0.00 | 0.22 | 0.00 |
| 29 | 0.00 | 0.78 | 0.00 | 0.22 | 0.00 |
| 30 | 0.00 | 0.78 | 0.00 | 0.22 | 0.00 |
| 31 | 0.00 | 0.78 | 0.00 | 0.22 | 0.00 |

| No. | (La$_2$O$_3$ + Gd$_2$O$_3$ + Y$_2$O$_3$ + Yb$_2$O$_3$)/(SiO$_2$ + B$_2$O$_3$) | (La$_2$O$_3$ + Gd$_2$O$_3$ + Y$_2$O$_3$ + Yb$_2$O$_3$ + TiO$_2$ + Nb$_2$O$_5$ + Ta$_2$O$_5$)/SiO$_2$ + B$_2$O$_3$) |
|---|---|---|
| 1 | 1.97 | 2.09 |
| 2 | 1.90 | 2.01 |
| 3 | 1.90 | 2.00 |
| 4 | 1.88 | 1.98 |
| 5 | 2.03 | 2.17 |
| 6 | 2.06 | 2.20 |
| 7 | 2.02 | 2.16 |
| 8 | 2.37 | 2.52 |
| 9 | 2.46 | 2.55 |
| 10 | 2.34 | 2.46 |
| 11 | 2.38 | 2.50 |
| 12 | 2.34 | 2.49 |
| 13 | 2.35 | 2.50 |
| 14 | 2.35 | 2.44 |
| 15 | 1.97 | 2.07 |
| 16 | 1.94 | 2.08 |

TABLE 1-continued

| | | |
|---|---|---|
| 17 | 1.93 | 2.05 |
| 18 | 1.94 | 2.07 |
| 19 | 1.94 | 2.07 |
| 20 | 1.96 | 2.09 |
| 21 | 1.97 | 2.07 |
| 22 | 1.97 | 2.06 |
| 23 | 1.97 | 2.05 |
| 24 | 2.35 | 2.44 |
| 25 | 1.96 | 2.09 |
| 26 | 1.94 | 2.06 |
| 27 | 1.96 | 2.09 |
| 28 | 1.96 | 2.12 |
| 29 | 1.97 | 2.09 |
| 30 | 1.97 | 2.09 |
| 31 | 1.96 | 2.09 |

| No. | nd | vd | specific gravity | specific gravity/nd | Pg.f | glass transition temperature Tg (° C.) | liquidus temperature LT (° C.) | λ70/λ5 (nm) |
|---|---|---|---|---|---|---|---|---|
| 1 | 1.80631 | 46.21 | 4.45 | 2.46 | 0.555 | 668 | 1150 | 362/314 |
| 2 | 1.8012 | 46.45 | 4.39 | 2.44 | 0.557 | 673 | 1130 | 365/315 |
| 3 | 1.80249 | 46.15 | 4.4 | 2.44 | 0.558 | 674 | 1150 | 367/331 |
| 4 | 1.80186 | 46.19 | 4.4 | 2.44 | 0.559 | 673 | 1150 | 366/331 |
| 5 | 1.80772 | 45.87 | 4.48 | 2.48 | 0.559 | 692 | 1200 | 358/313 |
| 6 | 1.81125 | 45.58 | 4.53 | 2.5 | 0.562 | 683 | 1200 | 358/313 |
| 7 | 1.80782 | 45.37 | 4.49 | 2.49 | 0.562 | 694 | 1200 | 358/313 |
| 8 | 1.8226 | 45.3 | 4.57 | 2.51 | 0.566 | 702 | 1250 | 360/313 |
| 9 | 1.81966 | 46.07 | 4.6 | 2.53 | 0.559 | 702 | 1250 | 358/308 |
| 10 | 1.81595 | 45.94 | 4.53 | 2.49 | 0.558 | 715 | 1250 | 358/311 |
| 11 | 1.81791 | 46.05 | 4.55 | 2.5 | 0.565 | 715 | 1250 | 359/331 |
| 12 | 1.81705 | 45.59 | 4.54 | 2.5 | 0.56 | 711 | 1230 | 360/313 |
| 13 | 1.8169 | 45.64 | 4.54 | 2.5 | 0.56 | 714 | 1230 | 360/313 |
| 14 | 1.81608 | 46.21 | 4.56 | 2.51 | 0.557 | 714 | 1250 | 359/308 |
| 15 | 1.80405 | 46.32 | 4.4 | 2.44 | 0.558 | 688 | 1150 | 368/331 |
| 16 | 1.80398 | 46.15 | 4.39 | 2.44 | 0.557 | 689 | 1140 | 357/314 |
| 17 | 1.80362 | 46.51 | 4.41 | 2.45 | 0.557 | 681 | 1150 | 356/312 |
| 18 | 1.8031 | 46.37 | 4.39 | 2.43 | 0.558 | 688 | 1130 | 359/318 |
| 19 | 1.80363 | 46.29 | 4.39 | 2.44 | 0.558 | 690 | 1130 | 363/320 |
| 20 | 1.80392 | 46.31 | 4.4 | 2.44 | 0.558 | 690 | 1140 | 363/320 |
| 21 | 1.79976 | 46.26 | 4.4 | 2.44 | 0.558 | 690 | 1140 | 372/331 |
| 22 | 1.80399 | 46.42 | 4.4 | 2.44 | 0.557 | 688 | 1145 | 370/330 |
| 23 | 1.80445 | 46.42 | 4.41 | 2.44 | 0.557 | 687 | 1145 | 370/330 |
| 24 | 1.81573 | 46.35 | 4.64 | 2.56 | 0.559 | 712 | 1250 | 372/316 |
| 25 | 1.80348 | 46.31 | 4.41 | 2.44 | 0.558 | 685 | 1140 | 359/318 |
| 26 | 1.80486 | 45.78 | 4.4 | 2.44 | 0.558 | 688 | 1140 | 363/328 |
| 27 | 1.80434 | 46.25 | 4.41 | 2.44 | 0.556 | 689 | 1140 | 360/319 |
| 28 | 1.80359 | 45.71 | 4.38 | 2.44 | 0.56 | 673 | 1150 | 362/319 |
| 29 | 1.80412 | 46.32 | 4.39 | 2.44 | 0.557 | 675 | 1140 | 360/318 |
| 30 | 1.80307 | 46.37 | 4.39 | 2.44 | 0.56 | 686 | 1150 | 364/319 |
| 31 | 1.80327 | 46.43 | 4.4 | 2.44 | 0.561 | 686 | 1150 | 361/318 |

Example 2

A glass mass (glass gob) for press molding was prepared from various types of glasses obtained in Example 1. This glass mass was heated and softened in the air, and then was press molded in a press molding mold to produce a lens blank (optical element blank). The produced lens blank was taken out from the press molding mold and annealed, and was subjected to machining including the polishing, so that a spherical leans made of various types of glasses prepared in Example 1 was produced.

Example 3

A desired amount of molten glass prepared in Example 1 was put into the press molding mold and then press molded to produce a lens blank (optical element blank). The produced lens blank was taken out from the press molding mold, annealed, and subjected to machining including the polishing, so that a spherical leans made of various types of glasses prepared in Example 1 was produced.

Example 4

The molten glass prepared in Example 1 was solidified to prepare the glass mass (optical element blank), and the glass mass was annealed and was subjected to machining including the polishing, so that a spherical leans made of various types of glasses prepared in Example 1 was produced.

Example 5

A spherical lens prepared in Examples 2 to 4 was cemented to a spherical lens made of other types of glasses to produce a cemented lens. A bonding surface of the spherical lens prepared in Examples 2 to 4 was a convex face, while a bonding surface of the spherical lens made of other types of glasses was a concave face. The two bonding surfaces were made such that absolute values of a curvature radius are equal to each other. A UV curable adhesive for bonding an optical element was applied to the bonding surfaces, thus cementing the bonding surfaces of the two lenses to each other. Subsequently, ultraviolet rays were irradiated, through the spherical lens prepared in Examples 2 to 4, onto the adhesive applied to the bonding surfaces, thus solidifying the adhesive.

The cemented lens was produced in this manner. A bonding strength of the cemented lens was sufficiently high and optical performance was also of sufficient level.

Comparative Example 1

A glass (hereinafter referred to as glass I) disclosed in Example 19 of Patent Document 3 (Japanese Patent Laid-Open Publication Sho 59-195553) was reproduced. λ5 measured by the aforementioned method was 337 nm.

A spherical lens made of the glass I was prepared, and then a worker attempted to make a cemented lens as in Example 5. Although ultraviolet rays were irradiated, through the lens made of the glass I, onto the UV curable adhesive applied to the bonding surface, it was impossible to sufficiently cure the adhesive because the UV transmittance of the glass I was low.

Comparative Example 2

A worker attempted to reproduce a glass disclosed in Example 11 of Patent Document 4 (Japanese Patent Laid-Open Publication Sho 55-116641). While a melt was cooled and agitated in a crucible, granular crystals were precipitated, so that it was impossible to obtain glass.

Comparative Example 3

A worker attempted to reproduce a glass disclosed in Example 3 of Patent Document 5 (Japanese Patent Laid-Open Publication Sho 56-005345). While a melt was cooled and agitated in a crucible, the melt was crystallized, so that it was impossible to obtain glass.

Comparative Example 4

A worker attempted to reproduce a glass disclosed in Example 2 of Patent Document 6 (Japanese Patent Laid-Open Publication No. 2005-239544). While a melt was cooled and agitated in a crucible, the melt was crystallized, so that it was impossible to obtain glass.

Finally, each of the above-described aspects will be summarized.

According to an aspect, provided is a glass (glass A) containing, by mass %, the following components: 20 to 35% of $SiO_2$ and $B_2O_3$ in total, 50 to 70% of $La_2O_3$, $Gd_2O_3$, $Y_2O_3$ and $Yb_2O_3$ in total, 37 to 69% of $La_2O_3$, 0 to 3% of $Gd_2O_3$, 3% to 30% of $Y_2O_3$, 0% or more but less than 2% of $Yb_2O_3$, 2 to 15% of $ZrO_2$, 1 to 6% of $TiO_2$, $Nb_2O_5$ and $Ta_2O_5$ in total, 0 to 4% of ZnO, and 0 to 2% of $WO_3$, wherein a mass ratio $ZnO/Nb_2O_5$ is in a range of 0 to 1.0, but $Nb_2O_5$ is contained as an essential component, and a refractive index nd is in a range of 1.790 to 1.830, and an Abbe's number vd is in a range of 45 to 48.

According to an aspect, provided is a glass (glass B) containing, by mass %, the following components: 20 to 35% of $SiO_2$ and $B_2O_3$ in total, 50 to 70% of $La_2O_3$, $Gd_2O_3$, $Y_2O_3$ and $Yb_2O_3$ in total, 37 to 69% of $La_2O_3$, 0 to 3% of $Gd_2O_3$, 3% or more but less than 12% of $Y_2O_3$, 0% or more but less than 2% of $Yb_2O_3$, 2 to 15% of $ZrO_2$, 1 to 6% of $TiO_2$, $Nb_2O_5$ and $Ta_2O_5$ in total, 0 to 4% of ZnO, and 0 to 2% of $WO_3$, wherein a mass ratio $ZnO/Nb_2O_5$ is in a range of 0 to 5.0, but $Nb_2O_5$ is contained as an essential component, and a refractive index nd is in a range of 1.790 to 1.830, and an Abbe's number vd is in a range of 45 to 48.

The glasses A and B are the glass that has the refractive index and the Abbe's number in the aforementioned ranges, and may have excellent thermal stability and absorption characteristics that are desirable to produce a cemented optical element.

According to an aspect, in order to further improve the stability of the glass, the glasses A and B preferably satisfy one or more glass compositions that will be described below.

The total content of $Li_2O$, $Na_2O$, $K_2O$ and $Cs_2O$ is in the range of 0 to 5 mass %;

The total content of MgO, CaO, SrO and BaO is in the range of 0 to 5 mass %.

According to an aspect, in order to obtain preferable absorption characteristics by the manufacture of the cemented lens, the $WO_3$ content of the glass A or B is preferably in the range of 0 to 1%, more preferably in the range of 0 to 0.5%, much more preferably in the range of 0 to 0.3%, and still more preferably in the range of 0 to 0.1%. It is more preferable that $WO_3$ is not contained.

According to an aspect, the glass A or B is preferably a glass that has a coloring degree λ5 of 335 nm or less.

According to an aspect, in order to achieve the lightness of the optical element, the glass A or B is preferably a glass in which a value obtained by dividing the specific gravity by the refractive index nd is in the range of 2.00 to 2.56.

It is possible to manufacture the glass material for press molding, the optical element blank, and the optical element from the above-described glass (glass A or B). That is, according to another aspect, provided are the glass material for press molding, the optical element blank, and the optical element which are made of the above-described glass.

According to another aspect, provided is a method for producing a glass material for press molding, having a step of molding the aforementioned glass into the glass material for press molding.

According to a further aspect, provided is a method for producing an optical element blank, having a step of producing the optical element blank by press molding the aforementioned glass material for press molding using a press-molding mold.

According to yet another aspect, provided is a method for producing an optical element blank, having a step of molding the aforementioned glass into the optical element blank.

According to another aspect, provided is a method for producing an optical element, having a step of preparing the optical element by grinding and/or polishing the aforementioned optical element blank.

It is to be understood that the embodiments disclosed herein are illustrative and not restrictive. The invention is not limited by any of the details of description, but is defined by the appended claims. It should also be understood that all changes that fall within meets and bounds of the claims, or equivalence of such meets and bounds are intended to be embraced by the claims.

For example, for the above-described glass composition, it is possible to obtain a glass according to an aspect of the present invention by adjusting the composition described herein.

Of course, it is possible to optionally combine two or more of the above-described preferable ranges with each other.

The present invention is useful in the field of manufacturing an optical element, for example, various lenses such as a cemented lens, a prism, or the like.

What is claimed is:

1. A glass comprising, by mass %, the following components:
   20 to 35% of $SiO_2$ and $B_2O_3$ in total,
   50 to 70% of $La_2O_3$, $Gd_2O_3$, $Y_2O_3$ and $Yb_2O_3$ in total,
   37 to 69% of $La_2O_3$,
   0 to 3% of $Gd_2O_3$,
   3 to 30% of $Y_2O_3$,
   0% or more but less than 2% of $Yb_2O_3$,
   2 to 15% of $ZrO_2$,
   2 to 6% of $TiO_2$, $Nb_2O_5$ and $Ta_2O_5$ in total,
   0 to 4% of ZnO, and
   0 to 2% of $WO_3$,
   wherein a mass ratio of the total content of $La_2O_3$, $Gd_2O_3$, $Yb_2O_3$, $TiO_2$, $Nb_2O_5$ and $Ta_2O_5$ to a total content of $SiO_2$ and $B_2O_3$, $(La_2O_3+Gd_2O_3+Y_2O_3+Yb_2O_3+TiO_2+Nb_2O_5+Ta_2O_5)/(SiO_2+B_2O_3)$, is 1.95 or more,
   wherein a mass ratio of the $SiO_2$ content to the total content of $SiO_2$ and $B_2O_3$ $SiO_2/(SiO_2+B_2O_3)$, is 0.0727 or more,
   wherein a mass ratio of the $Y_2O_3$ content to a total content of $La_2O_3$, $Gd_2O_3$, $Y_2O_3$ and $Yb_2O_3$, $Y_2O_3/(La_2O_3+Gd_2O_3+Y_2O_3+Yb_2O_3)$, is 0.15 or more,
   wherein a mass ratio $ZnO/Nb_2O_5$ is in a range of 0 to 0.40, but $Nb_2O_5$ is contained as an essential component, and
   a refractive index nd is in a range of 1.800 to 1.830, and an Abbe's number vd is in a range of 45 to 48, wherein a relationship between the refractive index nd and the Abbe's number vd satisfies the equation: $nd>2.585-0.017\times vd$.

2. The glass according to claim 1, wherein a total content of $Li_2O$, $Na_2O$, $K_2O$ and $Cs_2O$ is in a range of 0 to 5 mass %.

3. The glass according to claim 1, wherein a total content of MgO, CaO, SrO and BaO is in a range of 0 to 5 mass %.

4. The glass according to claim 1, wherein a coloring degree $\lambda 5$ is 335 nm or less.

5. The glass according to claim 1, wherein a value obtained by dividing a specific gravity by the refractive index nd is in a range of 2.00 to 2.56.

6. The glass according to claim 1, wherein the mass ratio, $Y_2O_3/(La_2O_3+Gd_2O_3+Y_2O_3+Yb_2O_3)$, is 0.18 or more.

7. The glass according to claim 1, wherein the mass ratio, $ZnO/Nb_2O_5$, is in a range of 0 to 0.21.

8. The glass according to claim 1, wherein the mass ratio, $SiO_2/(SiO_2+B_2O_3)$, is 0.110 or more.

9. The glass according to claim 1, wherein the $SiO_2$ content is 5% or less.

10. The glass according to claim 1, wherein the mass ratio of the total content of $La_2O_3$, $Gd_2O_3$, $Y_2O_3$ and $Yb_2O_3$ to the total content of $SiO_2$ and $B_2O_3$, $(La_2O_3+Gd_2O_3+Y_2O_3+Yb_2O_3)/(SiO_2+B_2O_3)$, is 1.83 or more.

11. A glass material for press molding comprising the glass according to claim 1.

* * * * *